United States Patent
Hsieh et al.

(10) Patent No.: US 12,503,383 B2
(45) Date of Patent: Dec. 23, 2025

(54) SEMICONDUCTOR CHEMICAL MECHANICAL POLISHING SLUDGE RECYCLING DEVICE

(71) Applicants: Ya-Min Hsieh, Tainan (TW); Hsin-Hui Chou, Tainan (TW); Hsing-Wen Hsieh, Tainan (TW); Shao-Hua Hu, Tainan (TW); Wen-Ming Cheng, Tainan (TW); Chin-An Kuan, Tainan (TW)

(72) Inventors: Ya-Min Hsieh, Tainan (TW); Hsin-Hui Chou, Tainan (TW); Hsing-Wen Hsieh, Tainan (TW); Shao-Hua Hu, Tainan (TW); Wen-Ming Cheng, Tainan (TW); Chin-An Kuan, Tainan (TW)

(73) Assignee: Transcene Corporation, Tainan (TW)

( * ) Notice: Subject to any disclaimer, the term of this patent is extended or adjusted under 35 U.S.C. 154(b) by 348 days.

(21) Appl. No.: 18/188,497

(22) Filed: Mar. 23, 2023

(65) Prior Publication Data

US 2024/0317621 A1    Sep. 26, 2024

(51) Int. Cl.
*C02F 9/00* (2023.01)
*C01B 33/12* (2006.01)
(Continued)

(52) U.S. Cl.
CPC ............. *C02F 9/00* (2013.01); *C01B 33/12* (2013.01); *C02F 11/127* (2013.01);
(Continued)

(58) Field of Classification Search
CPC ........ C02F 9/00; C02F 11/127; C02F 11/143; C02F 11/18; C02F 2101/30;
(Continued)

(56) References Cited

FOREIGN PATENT DOCUMENTS

| CN | 1437643 A | * | 8/2003 | ............. B05D 7/546 |
| CN | 204981531 U | * | 1/2016 | ............. Y02W 10/40 |

(Continued)

OTHER PUBLICATIONS

English translation of CN1437643A, published Aug. 20, 2003. (Year: 2003).*

(Continued)

*Primary Examiner* — Joseph W Drodge

(57) ABSTRACT

The present invention relates to a semiconductor chemical mechanical polishing sludge recycling device, which includes a roasting device, a soaking and stirring device, a first centrifugal dehydration device, a cleaning device and a second centrifugal dehydration device arranged thereon. The roasting device heat-treats the semiconductor chemical mechanical polishing sludge to remove the impurities. The soaking and stirring device is connected with the roasting device. The roasted semiconductor chemical mechanical polishing sludge is placed in the soaking and stirring device. The first centrifugal dehydration device is connected with the soaking and stirring device. A product obtained by the soaking and stirring device is solidified and concentrated through the first centrifugal dehydration device. The cleaning device is connected with the first centrifugal dehydration device. The second centrifugal dehydration device is connected with the cleaning device. The product obtained through the centrifugation of the second centrifugal dehydration device is a silicon dioxide goods.

1 Claim, 2 Drawing Sheets

(51) Int. Cl.
*C02F 11/12* (2019.01)
*C02F 11/14* (2019.01)
*C02F 11/18* (2006.01)
*C02F 11/127* (2019.01)
*C02F 11/143* (2019.01)
*C02F 101/30* (2006.01)
*C02F 103/34* (2006.01)

(52) U.S. Cl.
CPC ............. *C02F 11/143* (2019.01); *C02F 11/18* (2013.01); *C02F 2101/30* (2013.01); *C02F 2103/346* (2013.01)

(58) Field of Classification Search
CPC .... C02F 2103/346; C02F 11/13; C02F 11/12; C02F 11/121; C02F 11/14; C02F 11/148; C01B 33/12; B09B 3/40; B09B 3/80; C09G 1/02; H01L 21/30625; B24B 57/00; B24B 57/02; B24B 57/04
USPC ........................................ 451/36, 37, 60, 446
See application file for complete search history.

(56) References Cited

FOREIGN PATENT DOCUMENTS

| | | | | | |
|---|---|---|---|---|---|
| CN | 115474527 | A | * | 12/2022 | ............... C05C 9/00 |
| CN | 112919477 | B | * | 11/2023 | ............. C01B 33/12 |
| KR | 20070102002 | A | * | 10/2007 | ............... C09G 1/02 |
| KR | 20140102696 | A | * | 8/2014 | ............. B24B 57/02 |
| WO | WO-0181490 | A2 | * | 11/2001 | ............. B05D 7/546 |
| WO | WO-2013122128 | A1 | * | 8/2013 | ............. B24B 57/02 |
| WO | WO-2019181498 | A1 | * | 9/2019 | |

OTHER PUBLICATIONS

English translation of KR20070102002A, published Oct. 18, 2007. (Year: 2007).*
English translation of WO2013122128A1, published Aug. 22, 2013. (Year: 2013).*
English translation of KR20140102696A, published Aug. 22, 2014. (Year: 2014).*
English translation of CN204981531U, published Jan. 20, 2016. (Year: 2016).*
English translation of WO2019181498A1, published Sep. 26, 2019. (Year: 2019).*
English translation of CN112919477A, published Jun. 8, 2021. (Year: 2021).*
English translation of CN115474527A, published Dec. 16, 2022. (Year: 2022).*

* cited by examiner

SEMICONDUCTOR CHEMICAL MECHANICAL POLISHING SLUDGE RECYCLING DEVICE

BACKGROUND OF THE PRESENT INVENTION

Field of Invention

The present invention relates to a semiconductor chemical mechanical polishing sludge recycling device.

Description of Related Arts

It is noted that a very important step in the silicon wafer production process is the chemical mechanical polishing (CMP) process. The sludge produced by semiconductor chemical mechanical polishing (referred to as CMP sludge) is the main solid waste of the wafer foundry, which comes from the chemical mechanical polishing process in the process of the wafer foundry. The sludge components are mainly high-hardness mineral ceramic materials such as silicon oxide, aluminum oxide, and cerium oxide, which are mainly abrasive debris components of silicon oxide particles. At present, CMP sludge is recognized as general industrial waste, leaving the factory in the form of waste code D0902 inorganic sludge, and entrusted with legal removal for burial, incineration or other treatment. However, the resources of such treatment methods cannot be reused, which is extremely wasteful of resources, and has no environmental protection benefits.

SUMMARY OF THE PRESENT INVENTION

The main purpose of the present invention is to provide a semiconductor chemical mechanical polishing sludge recycling device, which can effectively solve the problem of semiconductor chemical mechanical polishing sludge treatment.

A semiconductor chemical mechanical polishing sludge recycling device of present invention, mainly includes a roasting device, a soaking and stirring device, a first centrifugal dehydration device, a cleaning device and a second centrifugal dehydration device arranged thereon, wherein the roasting device heat-treats the semiconductor chemical mechanical polishing sludge to remove the organic impurities, wherein the soaking and stirring device is connected with the roasting device, and the roasted semiconductor chemical mechanical polishing sludge is placed in the soaking and stirring device, wherein the soaking and stirring device has a temperature control function and includes an adding device arranged thereon, wherein the adding device has an impregnating liquid contained therein, wherein the first centrifugal dehydration device is connected with the soaking and stirring device, wherein a product obtained by impregnation and stirring of the soaking and stirring device is solidified and concentrated through the first centrifugal dehydration device so as to remove the impregnating liquid in the product obtained, wherein the cleaning device is connected with the first centrifugal dehydration device, and the obtained product is washed with water by the cleaning device, wherein the second centrifugal dehydration device is connected with the cleaning device, and the product obtained through the centrifugation of the second centrifugal dehydration device is a silicon dioxide goods.

The semiconductor chemical mechanical polishing sludge recycling device of the present invention, wherein the impregnating liquid is implemented as a single ingredient solution of inorganic acid or organic acid, or as a mixed solution composed of inorganic acid, organic acid and deionized water, wherein the inorganic acid is implemented as hydrochloric acid, nitric acid, sulfuric acid, phosphoric acid, etc., and the organic acid is implemented as carboxyl acid (—COOH), sulfonic acid (R—SO3H), sulfinic acid (R—SOOH), and thiocarboxylic acid (R—SH), etc., wherein the equivalent concentration of inorganic acid and organic acid in the impregnating liquid shall not exceed 5N, so as to dissolve the impurities that allow the acid to dissolve.

The advantages provided by the semiconductor chemical mechanical polishing sludge recycling device of the present invention, include the following: the silicon dioxide powder obtained from CMP sludge can be used as refractory materials, industrial filling materials, ceramic materials, etc., so that resources can be fully reused and have great environmental protection benefits.

DETAILED DESCRIPTION OF THE PREFERRED EMBODIMENT

Figure 1:
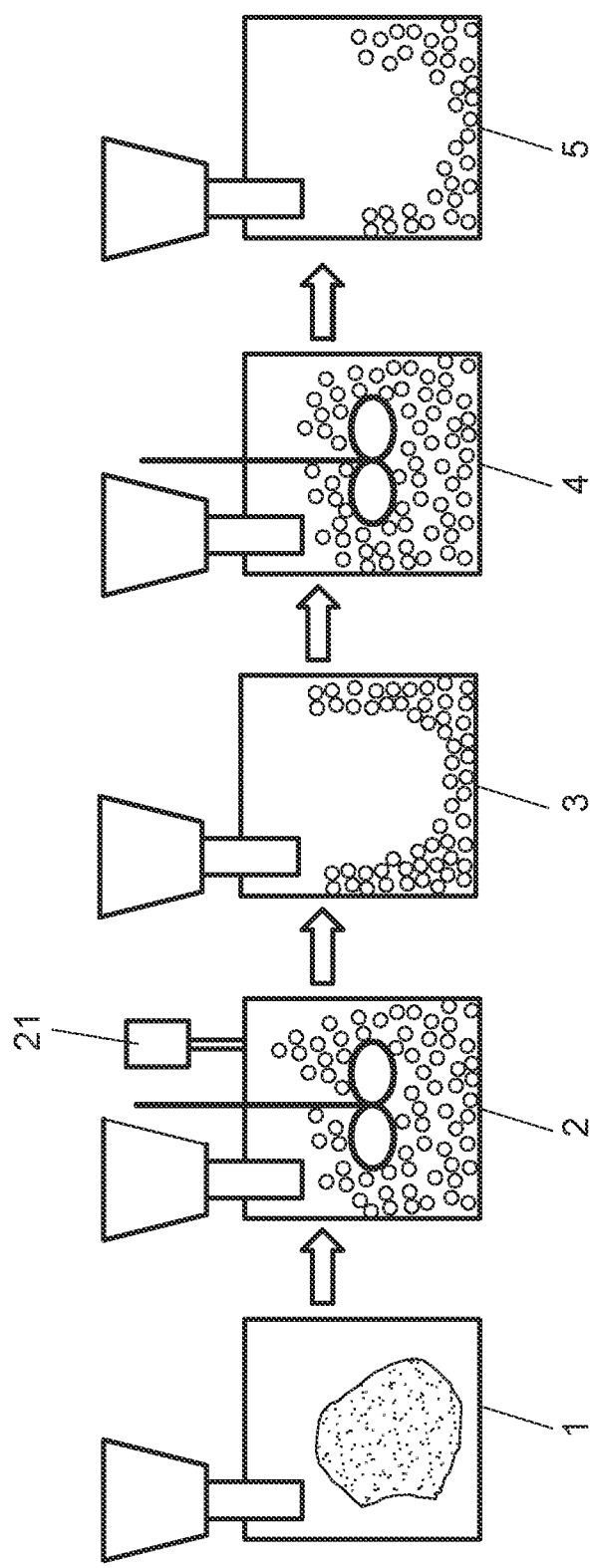
FIG. 1 is a perspective view of a device according to an embodiment of the present invention.

In order to achieve the above-mentioned objects and effects of the present invention, the technical means adopted are hereby enumerated through a preferred feasible embodiment, and illustrated in the drawings, detailed as follows:

According to an embodiment of the present invention, referring to FIG. 1, a semiconductor chemical mechanical polishing sludge recycling device mainly includes a roasting device 1, a soaking and stirring device 2, a first centrifugal dehydration device 3, a cleaning device 4 and a second centrifugal dehydration device 5 arranged thereon, wherein the roasting device 1 is used for heat treatment of semiconductor chemical mechanical polishing sludge (CMP sludge) at 800° C. to 1200° C. to remove the organic impurities, wherein the soaking and stirring device 2 is connected with the roasting device 1, and the roasted semiconductor chemical mechanical polishing sludge is placed in the soaking and stirring device 2, wherein the soaking and stirring device 2 has a temperature control function and includes an adding device 21 arranged thereon, wherein the adding device 21 has the impregnating liquid contained therein, wherein the impregnating liquid is implemented as a single ingredient solution of inorganic acid or organic acid, or as a mixed solution composed of inorganic acid, organic acid and deionized water, wherein the inorganic acid is implemented as hydrochloric acid, nitric acid, sulfuric acid, phosphoric acid, etc., and the organic acid is implemented as carboxyl acid (—COOH), sulfonic acid (R—SO3H), sulfinic acid (R—SOOH), and thiocarboxylic acid (R—SH), etc., wherein the equivalent concentration of inorganic acid and organic acid in the impregnating liquid is less than 5N respectively, so as to dissolve the impurities that allow the acid to dissolve, wherein the first centrifugal dehydration device 3 is connected with the soaking and stirring device 2, wherein the impregnated and stirred product obtained by the soaking and stirring device 2 is then subjected to solid concentration by the first centrifugal dehydration device 3, so as to remove the impregnating liquid in the obtained product, wherein the cleaning device 4 is connected with the first centrifugal dehydration device 3, and the obtained product is washed with water by the cleaning device 4, wherein the second centrifugal dehydration device 5 is connected with the cleaning device 4, and the product obtained after cleaning is centrifuged by the second centrifugal dehydration device 5, which is a silicon dioxide goods.

Figure 2:
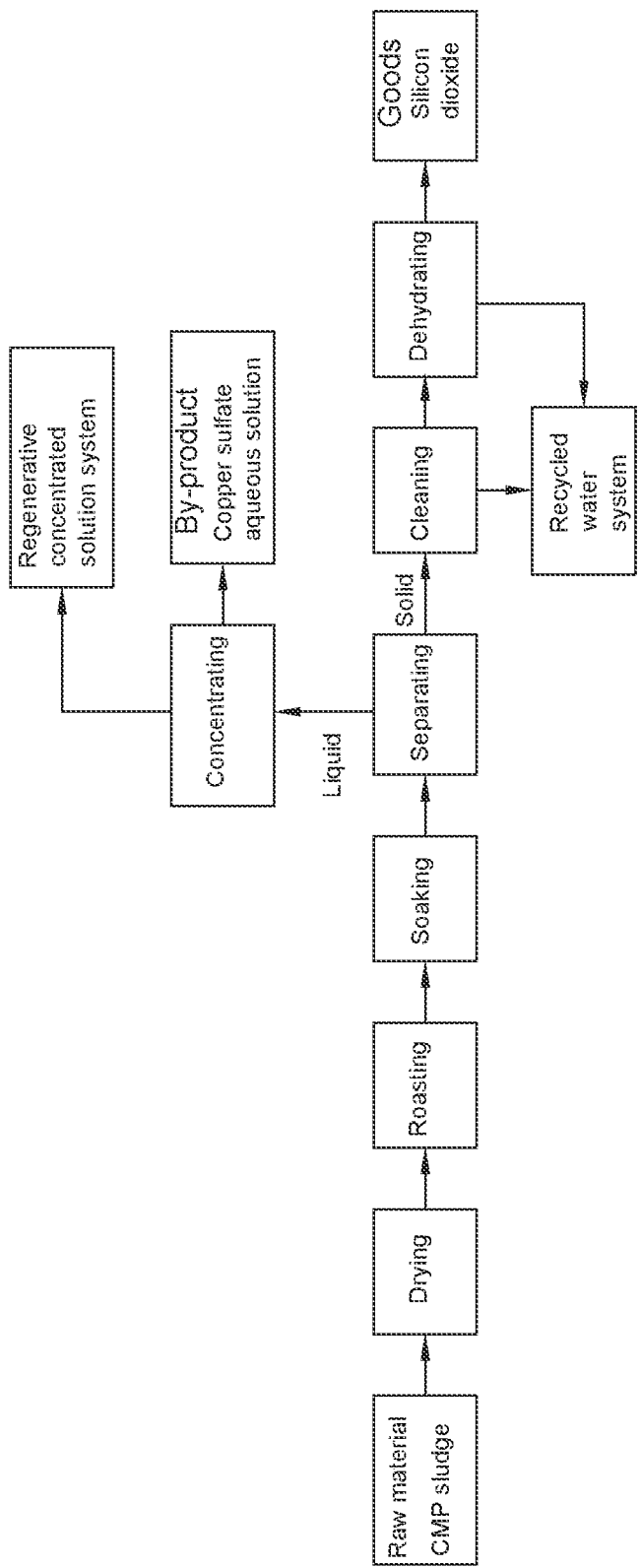
FIG. 2 is a flow diagram of a resource processing method according to the above embodiment of the present invention.

The present invention utilizes the above-mentioned device to carry out the semiconductor chemical mechanical polishing sludge recycling method, as shown in FIG. 2, wherein the recycling method includes the following steps:

(1) drying: drying out the CMP sludge into a condition of solid, wherein the drying temperature is 100° C.~200° C., and the drying time is 0.5~2 hours;

(2) roasting: putting the CMP dry sludge obtained in step (1) into a roasting device 1 (such as a high-temperature furnace) for roasting, the roasting temperature is 800° C.~1200° C., and the roasting time is 0.5~3 hours;

(3) soaking: putting the solid sludge obtained in step (2) into the soaking and stirring device 2 (such as a reaction tank), and adding the impregnating liquid from the adding device 21 for stirring, wherein the stirring temperature is 20° C.~80° C., the stirring time is 0.5~2 hours, and the weight ratio of liquid to solid of impregnating liquid and solid sludge is 1:1~10:1;

(4) separating: concentrating and collecting the product obtained in step (3) through the first centrifugal dehydration device 3 and removing the impregnating liquid from the product obtained to obtain solid and liquid;

(5) concentrating: performing a concentration reaction on the liquid separated in step (4) through a concentration system to obtain a copper sulfate aqueous solution by-product, and recycling the residual liquid in the concentration system into a regenerative concentrated solution system;

(6) cleaning: taking out the solid sludge obtained from the separation treatment in step (4) and putting into the cleaning device 4, adding water and washing with water, the turbidity of water is less than 150 NTU, the weight ratio of water to solid sludge is 1:1~10:1, and the washing time is 0.5~2 hours, and recycling the residual water after cleaning into a recycled water system;

(7) dehydrating: putting the product obtained in step (6) into the second centrifugal dehydration device 5 and dehydrating, and recycling the dehydrated liquid into the recycled water system; and (8) obtaining a goods: obtaining the solid obtained after dehydration in the step (7) is a silicon dioxide goods.

The device of the present invention recycles CMP sludge to obtain silicon dioxide powder, which can be used as refractory materials, industrial filling materials, ceramic materials, etc., so that resources can be fully reused, and it is extremely environmentally friendly.

In summary, the present invention has indeed achieved the expected objects and effects, and is more ideal and practical than those in the art. The above-mentioned embodiment is only specific descriptions for the preferred embodiments of the present invention, the embodiment is not intended to limit the scope of the patent application of the present invention, and all other equivalent changes and modifications accomplished without departing from the technical means disclosed in the present invention shall be covered by the present application.

What is claimed is:

1. A semiconductor chemical mechanical polishing sludge recycling device, comprising a roasting device, a soaking and stirring device, a first centrifugal dehydration device, a cleaning device and a second centrifugal dehydration device arranged thereon, wherein the roasting device is used for heat treatment of a semiconductor chemical mechanical polishing sludge to remove an organic impurity and form a roasted semiconductor chemical mechanical polishing sludge, wherein the soaking and stirring device is connected with the roasting device for placing the roasted semiconductor chemical mechanical polishing sludge in the soaking and stirring device for immersion and stirring to obtain a product, wherein the soaking and stirring device includes an adding device arranged thereon, wherein the adding device has an impregnating liquid contained therein, wherein the first centrifugal dehydration device is connected with the soaking and stirring device for removing the impregnating liquid in the product to obtain a solidified and concentrated product, wherein the cleaning device is connected with the first centrifugal dehydration device for washing the solidified and concentrated product, wherein the second centrifugal dehydration device is connected with the cleaning device to centrifugally dehydrate the washing solidified and concentrated product to obtain a silicon dioxide.

\* \* \* \* \*